(12) United States Patent
Renz et al.

(10) Patent No.: US 9,428,037 B2
(45) Date of Patent: Aug. 30, 2016

(54) ROLLER-BLIND SHAFT FOR A PROTECTIVE APPARATUS IN A VEHICLE INTERIOR

(71) Applicants: Guenter Renz, Ditzingen (DE); Cristian Winkler, Esslingen (DE)

(72) Inventors: Guenter Renz, Ditzingen (DE); Cristian Winkler, Esslingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/453,939

(22) Filed: Aug. 7, 2014

(65) Prior Publication Data

US 2015/0059994 A1  Mar. 5, 2015

(30) Foreign Application Priority Data

Aug. 27, 2013 (DE) .......................... 10 2013 217 083
Jul. 17, 2014 (DE) .......................... 10 2014 213 945

(51) Int. Cl.
*B60J 1/00* (2006.01)
*B60J 1/20* (2006.01)

(52) U.S. Cl.
CPC ........ *B60J 1/00* (2013.01); *B60J 1/205* (2013.01); *B60J 1/208* (2013.01)

(58) Field of Classification Search
CPC ............ B60J 1/00; B60J 1/205; B60J 1/208; E06B 9/44
USPC ....................................................... 160/262
See application file for complete search history.

(56) References Cited

U.S. PATENT DOCUMENTS

| | | | | |
|---|---|---|---|---|
| 516,018 A | * | 3/1894 | Lauer | B60J 1/205 160/262 |
| 1,071,158 A | * | 8/1913 | Harlbut | A47H 19/00 160/108 |
| 3,075,805 A | * | 1/1963 | Golde | B60J 7/0015 160/262 |
| 3,092,174 A | * | 6/1963 | Winn | B60J 1/205 160/262 |
| 4,932,711 A | * | 6/1990 | Goebel | 296/97.7 |

(Continued)

FOREIGN PATENT DOCUMENTS

EP           1 510 382 A1    3/2005
WO    WO 03/024729 A1    3/2003

OTHER PUBLICATIONS

Office Action of German Patent Office issued in Application No. 10 2013 217 083.1 dated Apr. 16, 2014 (4 pages).

*Primary Examiner* — Katherine Mitchell
*Assistant Examiner* — Scott Denion
(74) *Attorney, Agent, or Firm* — Flynn, Thiel, Boutell & Tanis, P.C.

(57) ABSTRACT

A roller-blind shaft for a protective apparatus in a vehicle interior on which at least one flexible flat structure is held such that it can be wound up and unwound, the roller-blind shaft having a curved bearing axle and sleeve-like roller-blind shaft sections which are mounted rotatably on the bearing axle and are connected axially to one another to form a rotationally locked unit.

In each case at least one axially inserted and axially secured sliding ring is provided for each roller-blind shaft section for mounting the roller-blind shaft sections on the bearing axle, which sliding ring mounts the roller-blind shaft section in a contactless manner at a radial spacing from the bearing axle.

19 Claims, 2 Drawing Sheets

(56) References Cited

U.S. PATENT DOCUMENTS

| | | | |
|---|---|---|---|
| 6,079,474 A * | 6/2000 | Lin | B60J 1/205 160/262 |
| 6,481,486 B1 * | 11/2002 | Sanz et al. | 160/84.06 |
| 6,523,770 B2 * | 2/2003 | Peeters | B60J 1/2033 160/262 |
| 7,314,079 B2 * | 1/2008 | Yano | B60J 1/2027 160/265 |
| 7,568,752 B1 * | 8/2009 | Lin | 296/97.8 |
| 8,851,142 B2 * | 10/2014 | Birkestrand | E06B 9/364 160/120 |
| 2005/0051285 A1 * | 3/2005 | Yano et al. | 160/370.22 |
| 2007/0137803 A1 | 6/2007 | Hansen et al. | |
| 2008/0179910 A1 * | 7/2008 | Fourel | 296/97.8 |
| 2011/0209836 A1 * | 9/2011 | Yu et al. | 160/305 |
| 2013/0038093 A1 * | 2/2013 | Snider | 296/219 |
| 2013/0068401 A1 * | 3/2013 | Birkestrand | 160/133 |
| 2015/0047793 A1 * | 2/2015 | Birkestrand | 160/89 |

\* cited by examiner

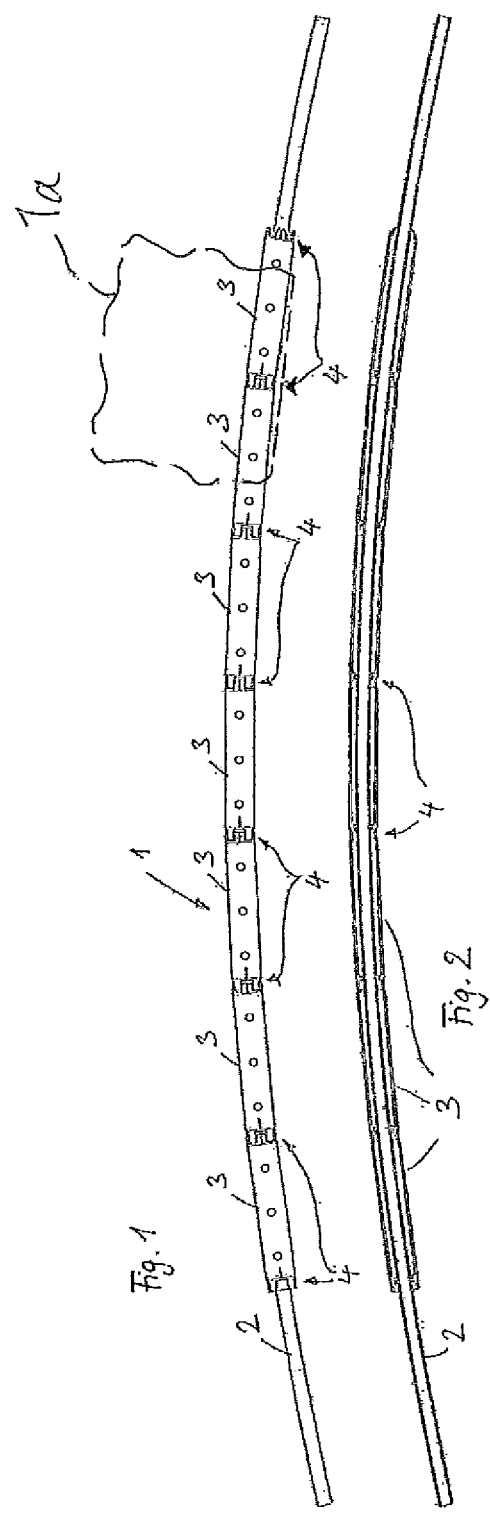

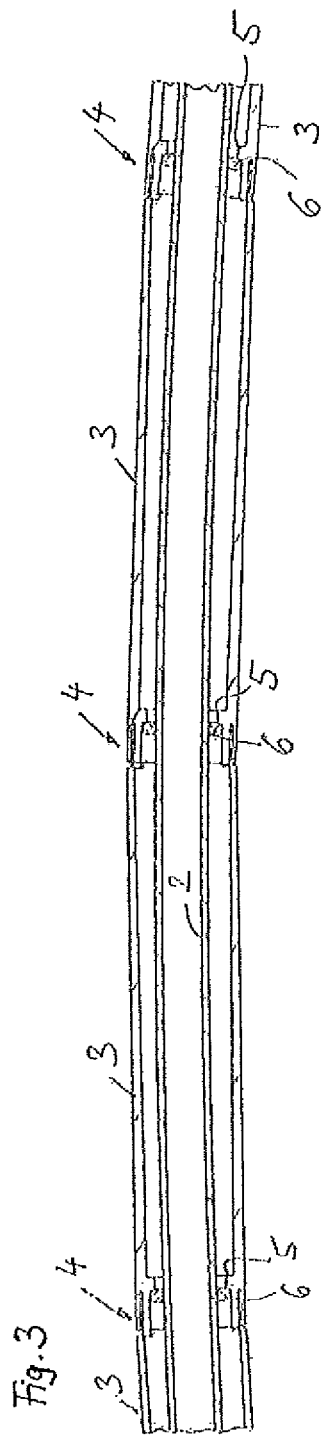
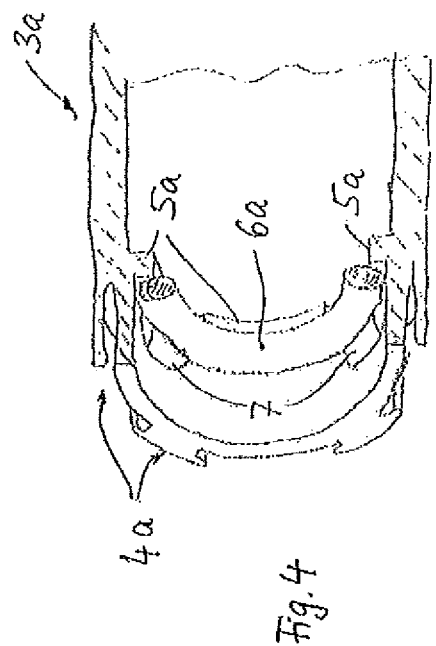

ROLLER-BLIND SHAFT FOR A PROTECTIVE APPARATUS IN A VEHICLE INTERIOR

CROSS-REFERENCE TO RELATED APPLICATIONS

This application claims priority from German Patent Applications Nos. DE 102013217083.1 and DE 102014213945.7, the disclosures of which are hereby incorporated by reference into this application in their entireties.

FIELD OF THE INVENTION

The invention relates to a roller-blind shaft for a protective apparatus in a vehicle interior, on which roller-blind shaft at least one flexible flat structure can be wound and unwound, the roller-blind shaft having a curved bearing axle and sleeve-like roller-blind shaft sections which are mounted rotatably on the bearing axle and are connected axially to one another to form a rotationally locked unit.

BACKGROUND OF THE INVENTION

EP 1 510 382 A1 has disclosed a roller-blind shaft of this type for shading a rear window of a motor vehicle. The known rear window roller blind has a curved roller-blind shaft, in order to make it possible to guide the flexible shading structure close to the rear window. The curved roller-blind shaft is formed by a plurality of roller-blind shaft sections which are plugged axially into one another, are of sleeve-shaped design and are mounted rotatably on a stationary, curved bearing axle. The roller-blind shaft sections are provided on their inner shell with integrally embossed beads which ensure sliding mounting of the roller-blind shaft sections on the bearing axle. As an alternative, the roller-blind shaft sections are provided with bearing bushes which are plugged in on the end side and by means of which the roller-blind shaft sections are mounted rotatably on the bearing axle.

OBJECTS AND SUMMARY OF THE INVENTION

It is an object of the invention to provide a roller-blind shaft of the type mentioned at the outset, which roller-blind shaft makes rotational mounting of the sleeve-like roller-blind shaft sections on the curved bearing axle possible using simple means.

This object is achieved by virtue of the fact that in each case at least one axially secured sliding ring is provided for each roller-blind shaft section for mounting the roller-blind shaft sections on the bearing axle, which sliding ring mounts the roller-blind shaft section in a contactless manner at a radial spacing from the bearing axle. If the respective sliding ring is produced separately from the corresponding roller-blind shaft section, the sliding ring is inserted axially and secured axially. The respective sliding ring can also be produced together with the corresponding roller-blind shaft section, in particular in a two-component injection molding process. In this embodiment, the sliding ring is also secured axially in the roller-blind shaft section, but then in a material-to-material manner on account of the two-component production. The sliding ring is preferably an O-ring made from metal or plastic. As an alternative, the sliding ring can be designed as a silicone ring or as an annular disk made from PTFE (polytetrafluoroethylene). In an advantageous way, the O-ring is provided with a circular cross section and is composed of silicone. The silicone O-ring is preferably coated with a PTFE varnish. It is also possible to provide fluorination for a corresponding silicone O-ring. A sliding ring which is designed in this way has a sufficiently satisfactory sliding function in a great temperature range between −30° C. and 120° C. A sliding ring which is produced as an annular disk from PTFE also has a satisfactory sliding function in the same temperature range. A silicone ring with a trapezoidal ring cross section or the cross-section of a pentagon also preferably has a sufficient sliding function in the same temperature range. A sliding ring can also be coated in a slidable manner in a different way or can be modified in a slidable manner with regard to its material, by sliding constituent parts being received in the material, in particular. The solution according to the invention is suitable in a particularly advantageous way for protective apparatuses in a vehicle interior, which protective apparatuses are used for shading rear windows or glass roof regions. In the glass roof region, the curved or bent bearing axle and accordingly the curved roller-blind shaft make increased headroom for vehicle occupants possible. The roller-blind shaft according to the invention is part of a protective apparatus, in which a flexible flat structure which serves to shade a corresponding vehicle window or a vehicle roof region is held on the roller-blind shaft such that it can be wound up and unwound. At a front end region in the extension direction, the flexible flat structure is provided with a dimensionally stable extraction profile which is preferably likewise curved over the width of the flat structure in an analogous manner to the curvature of the roller-blind shaft. The curvature is preferably effected in a circularly arcuate manner, preferably in a manner which is adapted to a rear window curvature or glass roof surface curvature of the vehicle interior. The axial securing preferably takes place by way of an annular collar on the inner shell of the respective roller-blind shaft section, which annular collar can be designed so as to be continuously annular or interrupted in the form of annular web sections.

In one refinement of the invention, the sliding ring is mounted rotatably on the bearing axle in a low-friction manner. In order to reduce the friction further, the sliding ring can be mounted rotatably on the bearing axle with radial play. The sliding rings preferably secure the roller-blind shaft sections radially without play on the bearing axle. As an alternative, a corresponding sliding ring can be arranged in a rotationally fixed manner on the bearing axle, and the roller-blind shaft section can be mounted in a rotationally movable manner with low friction on the sliding ring. As a result, low-friction rotatability of the roller-blind shaft sections on the stationary bearing axle is ensured.

In a further refinement of the invention, an axial securing means for axially supporting the sliding ring is provided on an inner shell of each roller-blind shaft section. The axial securing means is preferably formed by way of web or collar regions which are formed integrally on the inner shell and support the sliding ring in an axially positively locking manner.

In a further refinement of the invention, the axial securing means is designed in such a way that the sliding ring is secured in both axial directions. This avoids it being possible for the sliding ring to migrate axially on the inner shell of the respective roller-blind shaft section.

In a further refinement of the invention, supporting profiles which are formed integrally on the inner shell of the roller-blind shaft section are provided as axial securing means, which supporting profiles are provided on at least one axial side with run-up slopes for axially mounting the sliding ring in the roller-blind shaft section. The run-up slopes ensure that the sliding ring can be latched into the corresponding axial securing means by way of axial insertion. Accordingly, the run-up slopes facilitate the mounting of the respective sliding ring.

The invention also relates to a protective apparatus for a vehicle interior having at least one flexible flat structure which is held on a roller-blind shaft in the above-described way such that it can be wound up and unwound.

BRIEF DESCRIPTION OF THE DRAWINGS

Further advantages and features of the invention result from the claims and from the following description of preferred exemplary embodiments of the invention which are shown using the drawings, in which:

FIG. 1 shows one embodiment of a roller-blind shaft according to the invention having a rigid bearing axle which is curved in the shape of a circular arc and a plurality of roller-blind shaft sections which are mounted on the bearing axle in a rotationally movable manner, FIG. 2 shows a longitudinal sectional illustration of the roller-blind shaft according to FIG. 1, FIG. 3 shows an enlarged illustration of a detail of the roller-blind shaft according to FIG. 2, and FIG. 4 shows an enlarged isometric sectional illustration of a detail of a roller-blind shaft section of a further embodiment of a roller-blind shaft according to the invention which is modified slightly with respect to the embodiment according to FIGS. 1 to 3.

DETAILED DESCRIPTION

A roller-blind shaft 1 according to FIGS. 1 to 3 is part of a shading device which serves as a protective apparatus for a glass roof region of a vehicle interior. The shading device comprises a flexible shading structure 1a (only part of which shading structure 1a is shown in FIG. 2 in broken lines) which is held on the roller-blind shaft 1 such that it can be wound up and unwound. At a front end region in the unwinding direction, the flexible shading structure 1a is provided with a dimensionally stable extraction profile which is guided displaceably in the longitudinal guides which are fixed to the roof. The roller-blind shaft 1 is likewise held on the roof side.

The roller-blind shaft 1 comprises a bearing axle 2 which is held in a stationary manner and is configured as a dimensionally stable, substantially rigid hollow profile. The bearing axle 2 is produced from metal, preferably from a lightweight metal alloy. According to FIG. 1, a plurality of sleeve-like roller-blind shaft sections 3 which are plugged axially into one another are mounted on the bearing axle 2 in a rotationally movable manner. To this end, each roller-blind shaft section 3 is provided on its opposite end regions with in each case one axial plug region 4, the axial plug regions of each roller-blind shaft section 3 which lie opposite one another being designed so as to be complementary with respect to one another, in order to make it possible to plug them axially into one another and at the same time drive them in a rotationally locked manner. In the region of the axial plug regions 4, accordingly, the roller-blind shaft sections 3 are held in a slightly articulated manner relative to one another. As a result of the axial plug-in connection of the adjacent roller-blind shaft sections 3 to one another, the roller-blind shaft sections 3 form a shaft section assembly which can be rotated jointly as one unit on the bearing axle 2. The roller-blind shaft sections 3 follow the curvature of the bearing axle 2, as can be gathered from FIGS. 1 and 2.

According to FIGS. 2 and 3, each roller-blind shaft section is mounted rotatably on an outer shell of the bearing axle 2 by means of in each case one sliding ring 6. Since the adjacent roller-blind shaft sections 3 are plugged axially into one another, the support of each roller-blind shaft section 3 by means of a single sliding ring 6 on the bearing axle 2 is sufficient. By way of the sliding rings 6, the roller-blind shaft sections 3 are held with their inner circumference radially spaced apart from the outer shell of the bearing axle 2, as can be gathered from FIG. 3. The sliding rings 6 enclose the outer shell of the bearing axle 2 without play. The bearing axle 2 has a cylindrical outer shell. The roller-blind shaft sections 3 are also of hollow-cylindrical design. Whereas the bearing axle 2, however, is curved in a circularly arcuate manner, the roller-blind shaft sections 3 per se are configured in each case as hollow cylinders with a rectilinear rotational axis.

Each hollow-cylindrical roller-blind shaft section 3 has axial plug profiles with a bush function at one end region and axial plug profiles with a plug function at the opposite end region, with the result that in each case the end region which is provided with the plug function can be plugged into the complementary end region, provided with the bush function, of the adjacent roller-blind shaft section 3.

The respective sliding ring 6 is provided approximately at the level of the end region of each roller-blind shaft section 3, which end region assumes the bush function. In this region, the inner shell of the respective roller-blind shaft section 3 is provided with a radially inwardly protruding annular collar 5 which is formed integrally on the inner shell of the roller-blind shaft section 3 and makes an axial support for the sliding ring 6 possible. The respective sliding ring 6 is configured as an O-ring made from a plastic material with satisfactory sliding properties relative to the metal tube of the bearing axle 2. The radial extent of the annular collar 5 is less than a diameter of the sliding ring 6 as viewed radially, with the result that the respective roller-blind shaft section 3 is also positioned in the region of the annular collar 5 spaced apart radially from the outer shell of the bearing axle 2. Before the mounting of the roller-blind shaft sections 3 on the bearing axle 2, the sliding ring 6 is inserted axially into the respective roller-blind shaft section 3 from the end region and is pressed onto the annular collar 5. Here, each sliding ring 6 is seated in a radially non-positive manner in the inner shell of the roller-blind shaft section 3.

The embodiment according to FIG. 4 corresponds substantially to the embodiment which has been described above using FIGS. 1 to 3. In order to avoid repetitions, reference is therefore made to the disclosure with respect to the embodiment according to FIGS. 1 to 3. In the following text, merely the differences of the embodiment according to FIG. 4 will be described. Functionally and/or structurally identical sections and parts of the embodiment according to FIG. 4 are provided with identical designations with the addition of the letter a.

In the following text, the differences of the embodiment according to FIG. 4 will be described. The essential difference of the embodiment according to FIG. 4 is that the respective roller-blind shaft section 3a for the respective sliding ring 6a also comprises an additional axial securing means in the axial side which lies opposite the annular collar 5a. In the embodiment according to FIG. 4, the annular collar 5a is formed by a plurality of annular web sections which are arranged distributed over the circumference of the inner shell of the roller-blind shaft section 3a and against which the sliding ring 6a bears axially. The annular web sections 5a are aligned with one another in the circumferential direction. At an axial spacing from the annular web sections of the annular collar 5a, latching lugs 7 are formed integrally on the inner shell of the roller-blind shaft section 3a, which latching lugs 7 are provided with axially running run-up slopes on their side which faces the end region of the roller-blind shaft section 3a. During the axial insertion of the sliding ring 6a, the latter is pressed axially over the latching lugs 7 by way of elastic deformation and latches behind the latching lugs 7 between the latching lugs 7 and the annular collar 5a axially without play. The latching lugs 7 are preferably also provided with run-up slopes in the region of their flanks which face the annular collar 5a, in order to also again make a dismantling possible for the sliding ring 6a. Both the latching lugs 7 and the annular web sections which form the annular collar 5a are formed integrally on the inner shell of the roller-blind shaft section 3a. The roller-blind shaft sections 3, 3a are preferably designed as plastic hollow profiles and are produced in an injection molding process. The respective annular collar 5, 5a and the latching lugs 7 are already formed integrally during the production of the roller-blind shaft sections 3, 3a.

The invention claimed is:

1. A roller-blind shaft assembly for a protective apparatus in a vehicle interior, said assembly comprising:
   a curved bearing axle;
   a plurality of roller-blind shaft sleeve sections non-rotatably and axially connected to one another to form a unitary roller-blind shaft, said roller-blind shaft windably mounting thereon a flexible sheet structure; and
   a plurality of rings provided on said bearing axle, each said ring mounting one of said roller-blind shaft sleeve sections on said bearing axle for rotation relative thereto, each said ring being disposed radially between said bearing axle and the respective said roller-blind shaft sleeve section to maintain the respective said roller-blind shaft sleeve section radially spaced from, and not in contact with, said bearing axle, wherein movement of each said ring relative to the respective said roller-blind shaft sleeve section is prevented in at least one axial direction by a protrusion and each said ring is slidably movable relative to one of said bearing axle or the respective said roller-blind shaft sleeve section.

2. The assembly according to claim 1, further including a plurality of said protrusions, each said protrusion being disposed adjacent one of said rings to prevent movement thereof in the at least one axial direction.

3. The assembly according to claim 2, wherein each said roller-blind shaft sleeve section has an inner surface disposed adjacent to and facing said bearing axle, and each said protrusion projects radially inwardly from said inner surface of one of said roller-blind shaft sleeve sections.

4. The assembly according to claim 3, wherein each said protrusion is formed as an integral and one-piece component with the respective said roller-blind shaft sleeve section.

5. The assembly according to claim 1, wherein said rings are discrete and separate from one another and are disposed in an axially spaced-apart manner with one another along said bearing axle.

6. The assembly according to claim 1, wherein each said ring is mounted for rotation relative to said bearing axle to minimize friction between each said ring and said bearing axle.

7. The assembly according to claim 3, wherein each said roller-blind shaft sleeve section has a pair of ends which open in opposite axial directions from one another, each said end being non-rotatably connected to one of said ends of an axially-adjacent one of said roller-blind shaft sleeve sections, and one of said rings is disposed within an interior of the respective said roller-blind shaft sleeve section adjacent one of said ends thereof.

8. The assembly according to claim 1, further including a securing arrangement disposed within an interior of each said roller-blind shaft sleeve section to prevent movement of the respective said ring relative thereto in the at least one axial direction, each said securing arrangement including a said protrusion.

9. The assembly according to claim 8, wherein each said securing arrangement is configured to prevent movement of the respective said ring in two opposite axial directions.

10. The assembly according to claim 9, wherein said protrusion of each said securing arrangement is a first protrusion which is radially-oriented, and each said securing arrangement includes a second radially-oriented protrusion disposed in axially-spaced relation with the respective said first protrusion and the respective said ring being disposed axially between said first and second protrusions, and at least one of said first or second protrusions is sloped along one axially-facing side thereof to facilitate axial mounting of the respective said ring within the corresponding said roller-blind shaft sleeve section.

11. A roller-blind shaft assembly for a shading apparatus for a vehicle interior, said assembly comprising:
    an elongate and curved bearing axle;
    a plurality of roller-blind shaft sleeve sections non-rotatably connected to one another in an end-to-end manner in an axial direction to form an elongate roller-blind shaft;
    a plurality of rings disposed in an axially spaced-apart manner with one another along said bearing axle, with each said ring mounting one of said roller-blind shaft sleeve sections on said bearing axle for rotation relative thereto, each said ring being disposed radially between said bearing axle and said one roller-blind shaft sleeve section to maintain said one roller-blind shaft sleeve section in a radially-spaced manner from said bearing axle; and
    a securing arrangement associated with each of said roller-blind shaft sleeve sections, each said securing arrangement including a protrusion disposed to prevent movement of one of said rings in one axial direction relative to the respective said roller-blind shaft sleeve section.

12. The assembly according to claim 11, wherein each said roller-blind shaft sleeve section has opposite ends which open axially away from one another, each said end of each said roller-blind shaft sleeve section being configured for non-rotatable connection to one said end of an axially-adjacent one of said roller-blind shaft sleeve sections, each said ring being disposed adjacent one of said ends of the respective said roller-blind shaft sleeve section within an interior thereof.

13. The assembly according to claim 12, wherein said protrusion is oriented radially within the respective said roller-blind shaft sleeve section adjacent the respective said ring.

14. The assembly according to claim 13, wherein said protrusion is fixed to, and extends radially inwardly from, an inner surface of the respective said roller-blind shaft sleeve section.

15. The assembly according to claim 11, wherein each said securing arrangement includes a pair of said protrusions oriented radially within an interior of the respective said roller-blind shaft sleeve section adjacent the respective said ring, said protrusions being axially-spaced from one another and disposed on opposite sides of the respective said ring to prevent movement thereof in two opposite axial directions relative to the respective said roller-blind shaft sleeve section.

16. The assembly according to claim 15, wherein one of said protrusions is sloped on an axially-facing surface thereof to facilitate installation of the respective said ring within said interior of the respective said roller-blind shaft sleeve section.

17. The assembly according to claim 11, wherein each said roller-blind shaft sleeve section has a pair of spaced-apart ends which open in opposite axial directions from one another and one of said rings is disposed within one said end of each said roller-blind shaft sleeve section and maintains the respective said roller-blind shaft sleeve section radially-spaced from, and out of contact with, said bearing axle.

18. The assembly according to claim 1, wherein each said roller-blind shaft sleeve section is mounted on said bearing axle for rotation relative thereto by one of said rings.

19. The assembly according to claim 11, wherein each said roller-blind shaft sleeve section is mounted on said bearing axle for rotation relative thereto by one of said rings.

* * * * *